Patented Oct. 17, 1939

2,176,086

UNITED STATES PATENT OFFICE 2,176,086

CONCENTRATED EMERGENCY RATION

Paul P. Logan, United States Army

No Drawing. Application March 9, 1938,
Serial No. 194,882

3 Claims. (Cl. 99—23)

(Granted under the act of March 3, 1883, as
amended April 30, 1928; 370 O. G. 757)

The invention described herein, if patented, may be manufactured and used by or for the Government for governmental purposes without the payment of any royalty thereon.

This invention relates to foods and more particularly to a concentrated emergency ration having a chocolate base especially adapted for army use or others during travel over extended periods when the general supply of food is uncertain, one that will not be bulky but will contain high food values.

An object of this invention is to provide a ration for emergency purposes that will not deteriorate under any climatic conditions.

A further object is to provide a product that is readily digested and easily assimilated by the human body.

Another object is to provide a product having the highest possible caloric value and that will occupy the smallest possible space.

A further object is to provide a product so palatable that it may be used daily over a long period.

Other objects and advantages will appear in the following description and claims, it being understood that slight quantitative changes in the elements may be resorted to without departing from the spirit or scope of the invention, and while a preferred embodiment of my invention is specifically referred to herein, it is desired to cover broadly the use of any carbohydrate substances in combination with a chocolate mixture to raise the normal melting point of same.

Sweetened chocolate offers the highest concentration of easily obtainable food material, and is generally a part of the ration of exploring parties, mountain climbers and others, but inasmuch as chocolate has a melting point of about 92 degrees Fahrenheit, it has little value as a reserve ration at any time in the tropics or during the hot summer months in temperate zones.

The content of chocolate which causes it to liquefy at a relatively low temperature of 92 degress Fahrenheit is its high percentage of fat, and in order to overcome this feature, it is necessary to introduce into the product some type of material that will absorb a sufficient amount of said fat to keep it from liquefying but not enough to appreciably diminish the food value of the chocolate. After experimenting with a variety of carbohydrate substances, including soy bean flour in various forms, rice flour, reground tapioca, wheat flour, cassava, and oat flour, it was found that a combination of dried skimmed milk powder and oat flour will absorb a great amount of liquid fat and hold it against liquefaction. Raw oat flour is over ninety percent assimilated in digestion and therefore equivalent to cooked oat flour from a nutritional standpoint.

The formula finally arrived at, produces a highly nutritious and palatable product which will retain its shape and form at one hundred thirty degrees Fahrenheit. The same results may be obtained by increasing or decreasing the oat flour content and making a like change in the fat content of the chocolate or by substituting some product similar to oat flour having the same absorbing quality.

A preferred embodiment of this invention is as follows:

| | Parts by weight |
|---|---|
| Bitter chocolate, containing 54% cacao fat | 160 |
| Sucrose | 160 |
| Skimmed milk powder | 70 |
| Oat flour, raw | 30 |
| Added cacao fat | 30 |
| Vanillin crystals concentrate | $\frac{1}{16}$ |

The product can be prepared in any factory which is equipped to make sweetened chocolate. The process of mixing the ingredients does not require the use of heat but does require the use of rubbing machines or finishing rollers. In the normal process of manufacturing chocolate products, the chocolate is turned into a liquid by friction and the other ingredients are added in small quantities to insure thorough mixing. Normal commercial chocolate products remain in a liquid or semi-liquid state even after all other ingredients have been added. The product here described becomes dough-like in consistency, and when first removed from the mixing machine must be handled like putty and molded by force.

Applicant's product has a caloric value of about twenty-three hundred per pound, which is high when compared to other foods. It is easily handled by the body in the process of metabolism, and its relatively high melting point makes it usable under all climatic conditions. It is especially adapted to meet the needs of the Army and has wide commercial value.

In the manner above described, a food product is produced of the highest caloric value, in the smallest possible package, that is of such a palatable character that will permit of its continued daily use over a long period and will not be affected by any climatic conditions.

As indicated above, applicant with the definite object of providing a product that was not known, could not be obtained on the market and could not be produced by any known combination of elements in the art, i. e., a highly concentrated ration especially adapted for Army use that would not be affected by the various temperatures encountered, which could be formed into blocks having the highest food value, could be packed, stored and transported in the most convenient manner, one that was palatable and pleasing to the taste and could be relished by a consumer should an emergency require its use alone over long periods and one that may be placed in storage for a number of years, without deterioration, after exhaustive research and experimentation, discovered the herein described product.

With the above and other conditions to meet and with full knowledge of the development of the art, and its failure to teach how to provide the required product, chocolate was selected as a base and with it an equal amount which is a high percentage, of sucrose both being domestic products and offering the highest concentration of easily obtainable materials, to constitute a relatively large proportion of the improved product. To the above is added skimmed milk powder to the amount of 70 per cent of that of the chocolate, said amount being relatively large and selected for its high nutritive and highly absorbent characteristics adapted to thoroughly mix with the sweetened chocolate and readily absorb a large part of the fat content of the chocolate released when ground, in such a manner that said fat, which causes chocolate to melt at low temperatures but when taken up by milk powder will not be affected by temperatures up to close to 40 degrees Fahrenheit above its normal melting point when in its native chocolate. Milk powder is also readily accessible in large quantities at reasonable prices, which further assisted in its selection over others as an element of the mixture. Oat flour, raw, is added not only to assist in the complete absorption of the fat released from the chocolate when ground, but as a highly nutritive substance readily accessible and locally obtainable in large quantities, is economically obtained and prepared, it being equally as palatable and digestible in its raw state as when cooked. After the above four elements are thoroughly mixed into a semi-dry mixture, cacao fat of an amount by weight equal to that of the oat flour, is added to the mixture, not only for its food value but as a binder to convert elements then in the mixture to a pasty consistency somewhat similar to, or possibly of less tendency to flow than putty. To the above is added a small quantity of vanillin crystal concentrate for the dual purpose of providing a product having a flavor that is practically a favorite with all consumers and also to provide a food having a pleasing odor.

The above elements provide a product consisting of a very high percentage of chocolate and sucrose and as a result a combination of two elements having the greatest obtainable concentrated food value. The one objection to the ordinary chocolate bars now on the market, that is responsible for their having no military value is due to their low melting qualities, which can be readily observed if an attempt is made to transport a bar of chocolate on the person, especially so, in trousers pocket or other close fitting garment. For said reason the Army and others have been unable to obtain the benefits of an otherwise very desirable concentrated food as an emergency concentrated ration that is universally liked, will be relished during extended periods and will stand high temperatures without melting.

That which causes the chocolate to liquefy at relatively low temperatures, i. e., about 92 degrees Fahrenheit is its high percentage of fat. The normal temperature of the body of a man is about 98.6 degrees Fahrenheit ranging up to approximately 101 degrees and a fraction under the hardest working conditions and even as high as to approach the temperature of sunstroke or 107 degrees. Said temperatures will be far below the heat of 130 degrees Fahrenheit required to render unedible the food here described. The temperatures of the body of a horse or mule is only slightly above that of man, and any additional heat from the outside can be readily provided against. This is equally true of transportation by truck or in cars.

While in storage the rations may be kept in the shade and under cover with air space for circulation in any climate without permitting it to reach its melting point which is over 20 degrees above the highest heat that it will be subjected to under the most adverse conditions.

Having described my invention, what I claim and desire to secure by Letters Patent is:

1. The herein described concentrated food adapted to withstand temperatures up to 130° F., without liquefaction, consisting of bitter chocolate, sucrose, skimmed milk powder, raw oat flour, cacao fat and vanillin crystals concentrate combined substantially as described.

2. The herein described concentrated food adapted to withstand temperatures up to 130° F. without liquefaction, consisting of a molded mixture of bitter chocolate, containing about 54% cacao fat, 160 parts by weight, sucrose 160 parts by weight, skimmed milk powder 70 parts by weight, raw oat flour 30 parts by weight, cacao fat 30 parts by weight, and vanillin crystals concentrate $\frac{1}{18}$ part by weight.

3. The herein described process of making a concentrated food to withstand temperatures up to 130° F. without liquefaction, comprising reducing bitter chocolate to a liquid by grinding to release its fat, adding an equal amount of sucrose to sweeten, about 43% of skimmed milk powder to partly absorb the fat released from the chocolate and add food value, about 19% of raw oat flour, for its caloric value and absorb the remaining fat released from the chocolate, about 19% of cacao fat for its food value and as a binder, vanillin crystals concentrate to flavor, intimately mixing the mass and molding.

PAUL P. LOGAN.